US007155502B1

(12) United States Patent
Galloway et al.

(10) Patent No.: US 7,155,502 B1
(45) Date of Patent: Dec. 26, 2006

(54) METHODS, APPARATUSES AND SYSTEMS FACILITATING DISTRIBUTION OF UPDATED TRAFFIC IDENTIFICATION FUNCTIONALITY TO BANDWIDTH MANAGEMENT DEVICES

(75) Inventors: Brett D. Galloway, Los Altos, CA (US); Michael J. Quinn, Campbell, CA (US)

(73) Assignee: Packeteer, Inc., Cupertino, CA (US)

( * ) Notice: Subject to any disclaimer, the term of this patent is extended or adjusted under 35 U.S.C. 154(b) by 693 days.

(21) Appl. No.: 10/173,503

(22) Filed: Jun. 17, 2002

(51) Int. Cl.
*G06F 15/16* (2006.01)

(52) U.S. Cl. .................. 709/223; 709/203; 709/217; 370/395.41

(58) Field of Classification Search ........ 709/224–226, 709/223, 200–203, 217–220; 382/251; 370/231–232, 370/235, 395.41, 468, 477
See application file for complete search history.

(56) References Cited

U.S. PATENT DOCUMENTS

| | | | | |
|---|---|---|---|---|
| 6,012,100 | A * | 1/2000 | Frailong et al. ............ | 709/250 |
| 6,047,322 | A * | 4/2000 | Vaid et al. ................. | 709/224 |
| 6,167,567 | A * | 12/2000 | Chiles et al. .............. | 717/173 |
| 6,341,309 | B1 * | 1/2002 | Vaid et al. ................. | 709/223 |
| 6,493,871 | B1 * | 12/2002 | McGuire et al. ............ | 717/173 |
| 6,976,163 | B1 * | 12/2005 | Hind et al. ................. | 713/156 |
| 6,990,591 | B1 * | 1/2006 | Pearson ....................... | 726/22 |
| 2002/0100036 | A1 * | 7/2002 | Moshir et al. .............. | 717/173 |

OTHER PUBLICATIONS

Simson Garfinkel. Web Security & Commerce. © 1997, O'Reilly & Associates, Inc. Chapters 6.2 and 8.1.*
Author Unknown. "Dynamic Linking and Loading". Archive.org date: Sep. 28, 2000. Accessed from: HTTP://www.iecc.com/linker/linker10.html on Mar. 30, 2006.*
Freir et al. "The SSL Protocol Version 3.0 <draft-freier-ssl-version3-02.txt>". Published Nov. 18, 1996.*
Yavatkar et al. "RFC 2753: A framework for Policy-Based Admission Control". Published Jan. 2000.*
Durham et al. "RFC 2748: The COPS Protocol". Published Jan. 2000.*

* cited by examiner

*Primary Examiner*—Moustafa M. Meky
(74) *Attorney, Agent, or Firm*—Mark J. Spolyar

(57) ABSTRACT

Methods, apparatuses and systems facilitating the distribution of updated traffic identification functionality to bandwidth management devices. The present invention, in one embodiment, allows for automatic updates to the traffic identification functionality implemented by bandwidth management devices eliminating the cumbersome upgrade processes required by prior art methods and systems. The present invention, in one embodiment, also provides a system facilitating management of upgrades for multiple bandwidth management devices.

20 Claims, 5 Drawing Sheets

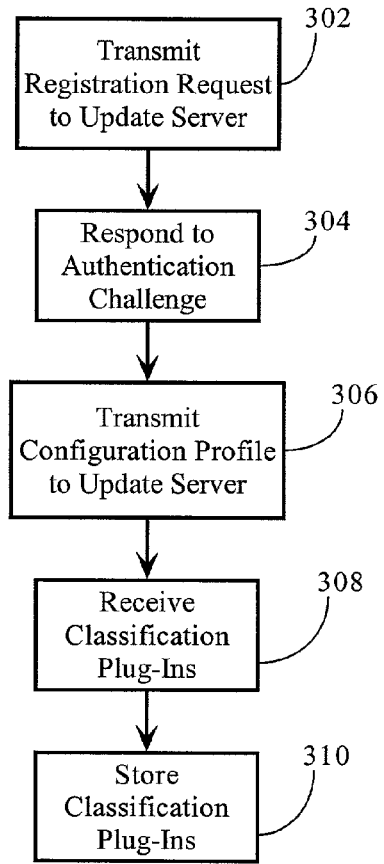
Fig._4
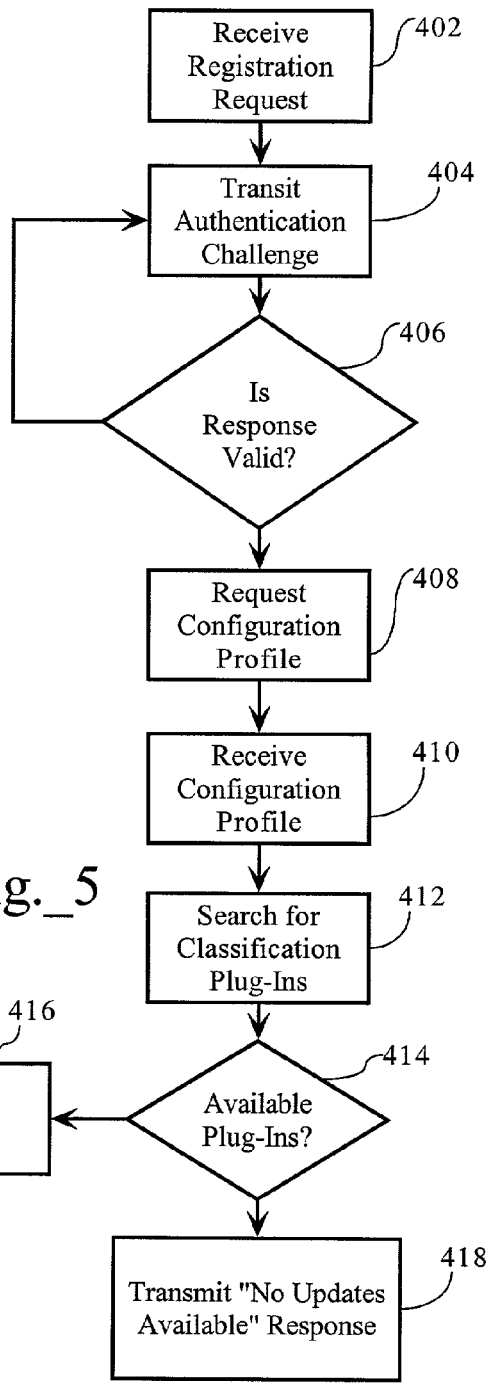
Fig._5

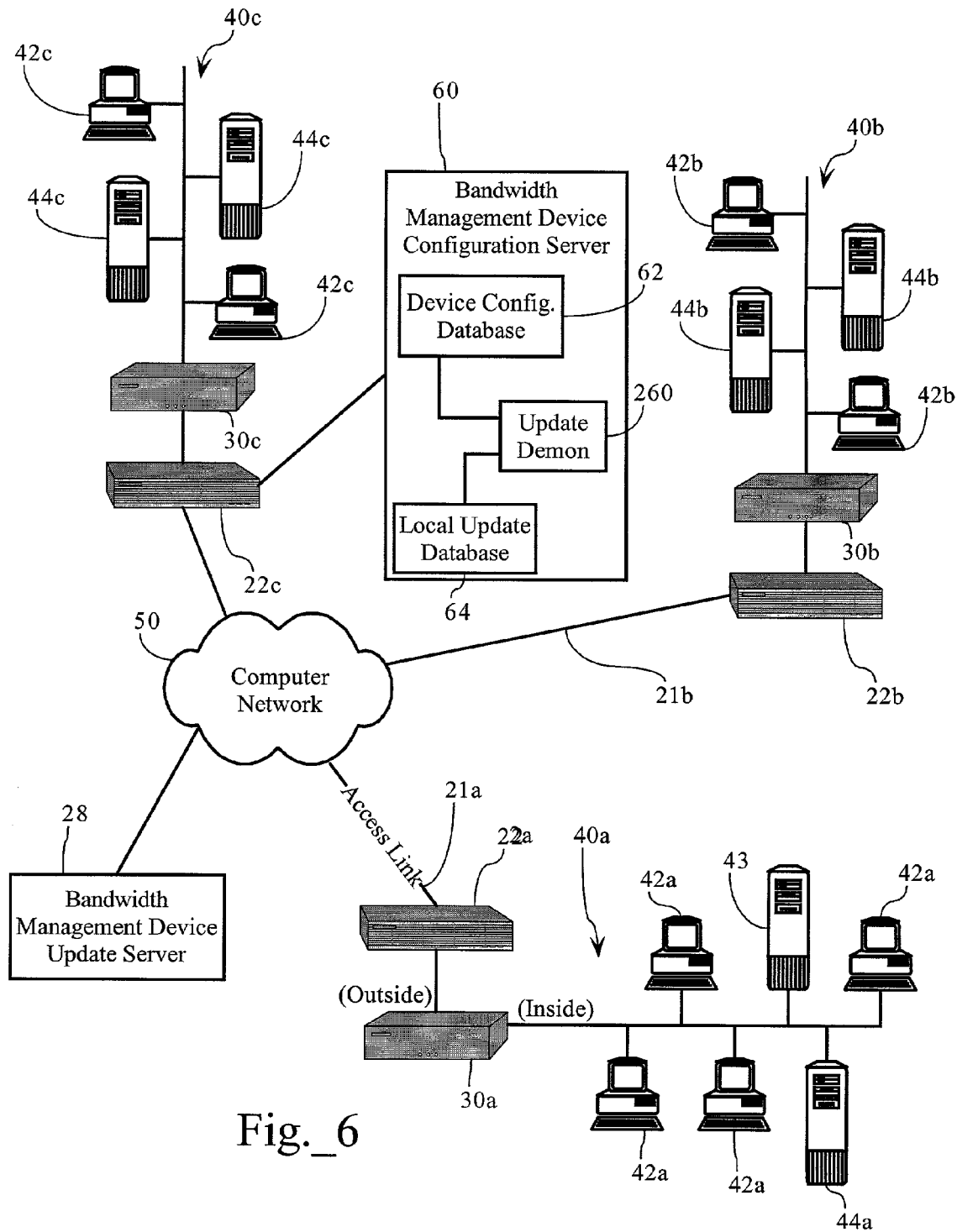
Fig._6

METHODS, APPARATUSES AND SYSTEMS FACILITATING DISTRIBUTION OF UPDATED TRAFFIC IDENTIFICATION FUNCTIONALITY TO BANDWIDTH MANAGEMENT DEVICES

CROSS-REFERENCE TO RELATED APPLICATIONS

This application makes reference to the following commonly owned U.S. patent applications and patents, which are incorporated herein by reference in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 08/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/106,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,051, in the name of Guy Riddle, entitled "Method for Automatically Determining a Traffic Policy in a Packet Communications Network;"

U.S. patent application Ser. No. 09/198,090, now U.S. Pat. No. 6,412,000, in the name of Guy Riddle and Robert L. Packer, entitled "Method for Automatically Classifying Traffic in a Packet Communications Network;"

U.S. patent application Ser. No. 09/206,772, in the name of Robert L. Packer, Brett D. Galloway and Ted Thi, entitled "Method for Automatically Classifying Traffic in a Packet Communications Network;"

U.S. patent application Ser. No. 09/966,538, in the name of Guy Riddle, entitled "Dynamic Partitioning of Network Resources;" and U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme."

FIELD OF THE INVENTION

The present invention relates to bandwidth management devices and, more particularly, to methods, apparatuses and systems facilitating the distribution of updated traffic identification functionality to bandwidth management devices.

BACKGROUND OF THE INVENTION

Efficient allocation of network resources, such as available network bandwidth, has become critical as enterprises increase reliance on distributed computing environments and wide area computer networks to accomplish business critical tasks. The widely-used TCP/IP protocol suite, which implements the world-wide data communications network environment called the Internet and is employed in many local area networks, omits any explicit supervisory function over the rate of data transport over the various devices that comprise the network. While there are certain perceived advantages, this characteristic has the consequence of juxtaposing very high-speed packets and very low-speed packets in potential conflict and produces certain inefficiencies. Certain loading conditions degrade performance of networked applications and can even cause instabilities which could lead to overloads that could stop data transfer temporarily.

In order to understand the context of certain embodiments of the invention, the following provides an explanation of certain technical aspects of a packet based telecommunications network environment. Internet/Intranet technology is based largely on the TCP/IP protocol suite. At the network level, IP provides a "datagram" delivery service—that is, IP is a protocol allowing for delivery of a datagram or packet between two hosts. By contrast, TCP provides a transport level service on top of the datagram service allowing for guaranteed delivery of a byte stream between two IP hosts. In other words, TCP is responsible for ensuring at the transmitting host that message data is divided into packets to be sent, and for reassembling, at the receiving host, the packets back into the complete message.

TCP has "flow control" mechanisms operative at the end stations only to limit the rate at which a TCP endpoint will emit data, but it does not employ explicit data rate control. The basic flow control mechanism is a "sliding window", a window which by its sliding operation essentially limits the amount of unacknowledged transmit data that a transmitter is allowed to emit. Another flow control mechanism is a congestion window, which is a refinement of the sliding window scheme involving a conservative expansion to make use of the full, allowable window. A component of this mechanism is sometimes referred to as "slow start."

The sliding window flow control mechanism works in conjunction with the Retransmit Timeout Mechanism (RTO), which is a timeout to prompt a retransmission of unacknowledged data. The timeout length is based on a running average of the Round Trip Time (RTT) for acknowledgment receipt, i.e. if an acknowledgment is not received within (typically) the smoothed RTT+4*mean deviation, then packet loss is inferred and the data pending acknowledgment is re-transmitted. Data rate flow control mechanisms which are operative end-to-end without explicit data rate control draw a strong inference of congestion from packet loss (inferred, typically, by RTO). TCP end systems, for example, will "back-off,"—i.e., inhibit transmission in increasing multiples of the base RTT average as a reaction to consecutive packet loss.

A crude form of bandwidth management in TCP/IP networks (that is, policies operable to allocate available bandwidth from a single logical link to network flows) is accomplished by a combination of TCP end systems and routers which queue packets and discard packets when some congestion threshold is exceeded. The discarded and therefore unacknowledged packet serves as a feedback mechanism to the TCP transmitter. Routers support various queuing options to provide for some level of bandwidth management. These options generally provide a rough ability to partition and prioritize separate classes of traffic. However, configuring these queuing options with any precision or without side effects is in fact very difficult, and in some cases, not possible. Seemingly simple things, such as the length of the queue, have a profound effect on traffic characteristics. Discarding packets as a feedback mechanism to TCP end systems may cause large, uneven delays perceptible to interactive users. Moreover, while routers can slow down inbound network traffic by dropping packets as a feedback mechanism to a TCP transmitter, this method often results in retransmission of data packets, wasting network traffic and, especially, inbound capacity of a WAN link. They can only explicitly control outbound traffic and cannot prevent inbound traffic from over-utilizing a WAN link. A 5% load or less on outbound traffic can correspond to a 100% load on inbound traffic, due to the typical imbalance between an outbound stream of acknowledgments and an inbound stream of data.

In response, certain data flow rate control mechanisms have been developed to provide a means to control and optimize efficiency of data transfer, as well as allocate available bandwidth among a variety of business applications. For example, U.S. Pat. No. 6,038,216 discloses a method for explicit data rate control in a packet-based network environment without data rate supervision. Data rate control directly moderates the rate of data transmission from a sending host, resulting in just-in-time data transmission to control inbound traffic and reduce the inefficiencies associated with dropped packets. In addition, bandwidth management devices classify network traffic and allow for explicit data rate control for flows associated with a particular traffic classification. U.S. Pat. No. 6,046,980, for example, teaches systems for managing bandwidth utilization at the network, transport and application layers in a packet-based network environment. Bandwidth management devices allow network administrators to specify policies operative to control and/or prioritize the bandwidth allocated to individual data flows according to traffic classifications. In addition, certain bandwidth management devices allow network administrators to divide available bandwidth into partitions. These partitions ensure a minimum bandwidth and/or cap bandwidth as to a particular class of traffic. An administrator specifies a traffic class (such as FTP data, or data flows involving a specific user or application) and the size of the reserved virtual link—i.e., minimum guaranteed bandwidth and/or maximum bandwidth. Such partitions can be applied on a per-application basis (protecting and/or capping bandwidth for all traffic associated with an application) or a per-user basis (protecting and/or capping bandwidth for a particular user). Furthermore, U.S. patent application Ser. No. 09/198,090, identified above, teaches methods and systems for automatically discovering and classifying network traffic to facilitate management of network bandwidth.

As the various applications, services and functionality deployed across computer network environments evolve, network traffic identification functionality must be augmented and/or modified in order to recognize new network traffic types or changes to existing network traffic types. Administration of bandwidth management devices to ensure that they have been upgraded to execute the latest traffic identification functionality, however, can become quite cumbersome. A network administrator often tasked with a variety of time-consuming responsibilities has to be notified or otherwise made aware of updated traffic identification functionality. The network administrator then must take the time to evaluate whether the updated functionality is worth the time and effort to install on the bandwidth management devices within the administrative domain. Finally, assuming the network administrator decides to upgrade the software of the bandwidth management device(s), he or she must then install the upgrade on the bandwidth management device(s). Indeed, the difficulties associated with bandwidth management device upgrades is exacerbated for network administrators managing multiple bandwidth management devices within the same administrative domain. Often, such administrative domains include multiple bandwidth management devices running different software versions and/or builds, requiring the network administrator to locate, download and install multiple, version- and/or build-specific upgrades. Given the foregoing, network administrators may decide that the effort to upgrade bandwidth management functionality on their networks may not be worth the time and effort, especially if the network administrator perceives that such bandwidth management devices are functioning adequately. This circumstance creates the undesirable trade off between the convenience or time-savings associated with not upgrading the bandwidth management devices versus the resulting decline in the capabilities of such devices as time progresses and the characteristics of network traffic evolve.

In light of the foregoing, a need exists in the art for methods, apparatuses and systems that facilitate the distribution of updated traffic identification functionality to bandwidth management devices. Embodiments of the present invention substantially fulfill this need.

SUMMARY OF THE INVENTION

The present invention provides methods, apparatuses and systems facilitating the distribution of updated traffic identification functionality to bandwidth management devices. The present invention, in one embodiment, allows for automatic updates to the traffic identification functionality implemented by bandwidth management devices eliminating the cumbersome upgrade processes associated with prior art methods and systems. The present invention, in one embodiment, also provides a system facilitating management of upgrades for multiple bandwidth management devices.

DESCRIPTION OF THE DRAWINGS

FIG. 4 is a flow chart setting forth a process flow associated with retrieving files embodying upgraded traffic identification functionality.

FIG. 5 is a flow chart diagram illustrating a process flow associated with registering a remote device and transmitting upgraded traffic identification functionality to the registered device.

FIG. 6 is a functional block diagram illustrating a computer network environment including a centralized, bandwidth management device configuration server according to an embodiment of the present invention.

DESCRIPTION OF PREFERRED EMBODIMENT(S)

Figure 1:
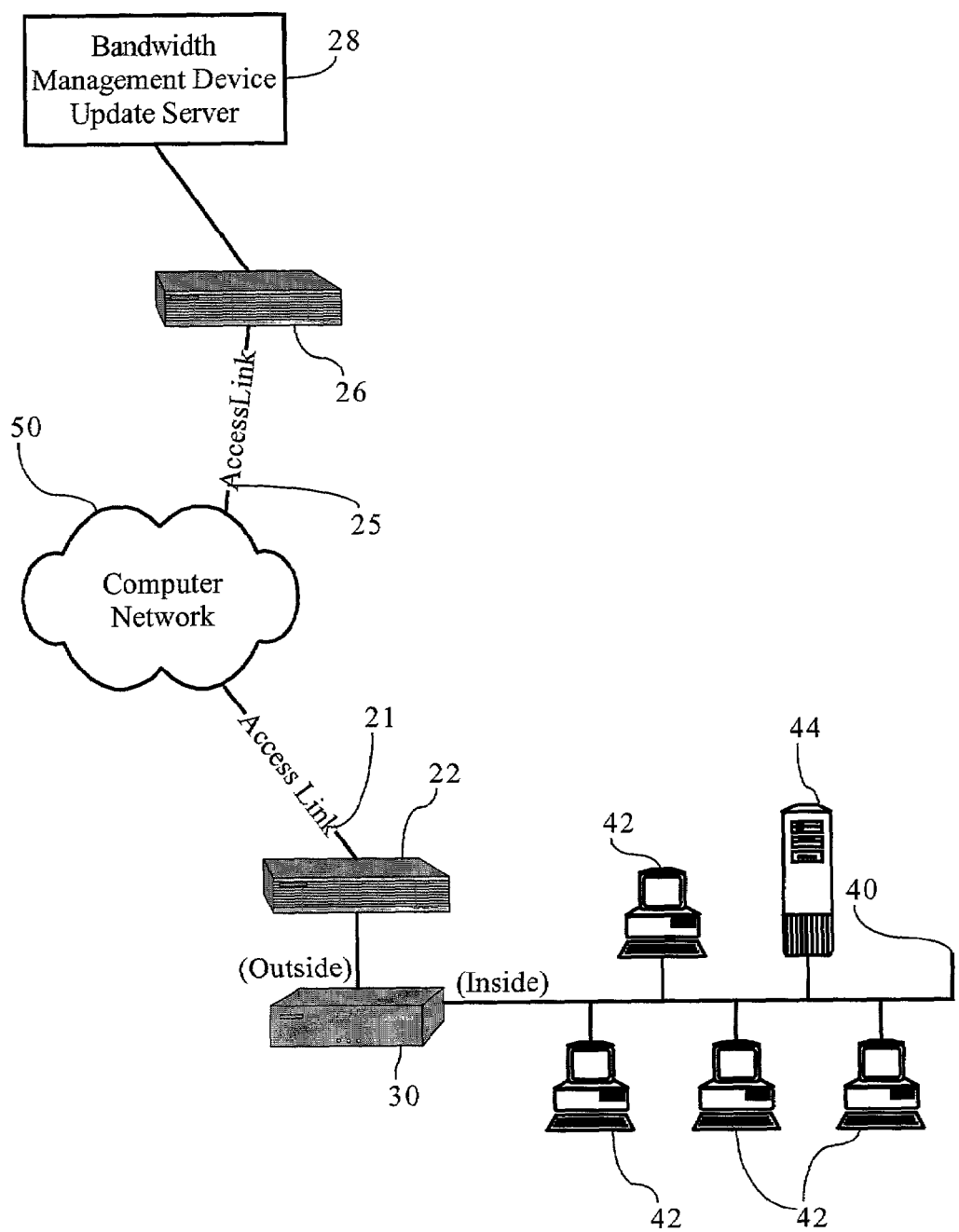
FIG. 1 is a functional block diagram illustrating a computer network environment including a bandwidth management device according to an embodiment of the present invention.

FIG. 1 sets forth a packet-based computer network environment including a bandwidth management device 30. As FIG. 1 shows, local area computer network 40 interconnects several TCP/IP end systems, including client devices 42 and server device 44, and provides access to resources operably connected to computer network 50 via router 22 and access link 21. Bandwidth management device update server 28 is a TCP end system connected to computer network 50 through router 26 and access link 25. The computer network environment, including computer network 50 is a packet-based communications environment, employing TCP/IP protocols, and/or other suitable protocols, and has a plurality of interconnected digital packet transmission stations. As FIG. 1 illustrates, bandwidth management device 30 is provided between router 22 and local area computer network 40. Bandwidth management device 30 is operative to classify data flows and, depending on the classification, enforce respective partitions and/or policies on the data flows to control bandwidth utilization across access link 21. Update server 28 stores files embodying updated traffic identification functionality and is operative to interact with bandwidth management device 30 to allow access to such upgrade files, as discussed more fully below.

A. Bandwidth Management Device

Figure 2:
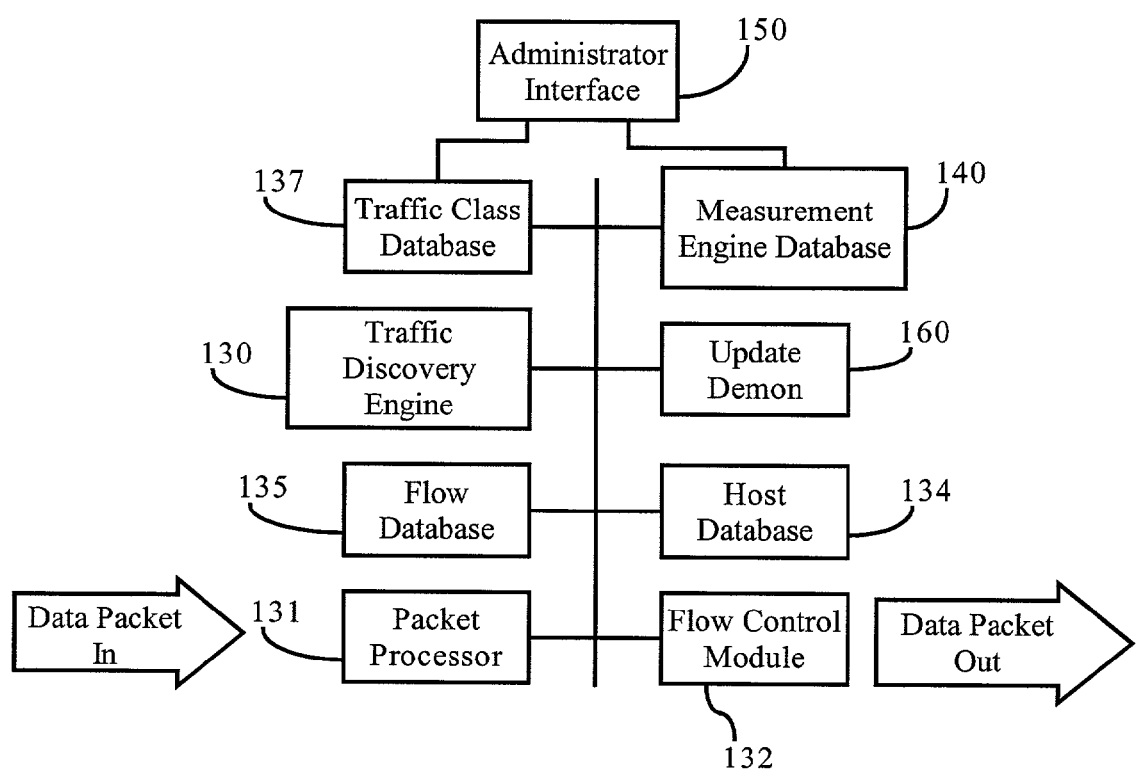
FIG. 2 is a functional block diagram setting forth the functionality in a bandwidth management device according to an embodiment of the present invention.

FIG. 2 is a block diagram illustrating functionality included in bandwidth management device 30. In one embodiment, bandwidth management device 30 comprises packet processor 131, flow control module 132, measurement engine 140, traffic discovery engine 130, traffic class database 137, administrator interface 150, and update demon 160. Packet processor 131 is operative to detect new data flows and construct data structures including attributes characterizing the data flow. Flow control module 132 is operative to enforce bandwidth utilization controls on data flows traversing bandwidth management device 30. Traffic discovery engine 130 is operative to detect traffic types associated with data flows, as discussed more fully below. In one embodiment, traffic discovery engine 130 is configured to automatically create traffic classes in traffic class database 137 based on the data flows traversing bandwidth management device 30. Traffic class database 137 stores traffic classes associated with data flows encountered during operation of bandwidth management device 30, as well as manually created traffic classes in a hierarchical traffic class structure, if any, configured by a network administrator. In one embodiment, traffic class database 137 stores traffic classes, in association with pointers to matching rules and bandwidth utilization controls or pointers to data structures defining such bandwidth utilization controls. Measurement engine 140 monitors operation of bandwidth management device 30 to monitor bandwidth utilization across access link 21 with respect to a plurality of bandwidth utilization and other network statistics on an aggregate and/or per-traffic class basis.

Update demon 160, when invoked, is operative to interact with update server 28 to obtain files embodying upgraded traffic identification functionality. Update demon 160 may be configured to execute in response to a variety of conditions. For example, update demon 160 may be configured to execute on a periodic basis (e.g., daily, weekly, monthly, etc.). Update demon 160 may also be invoked upon the receipt of an update command request from a remote device. A network administrator may also expressly invoke the update demon via administrator interface 150. Update demon 160 may also be configured to launch upon the occurrence of other events, such as the detection of data flows associated with an known traffic type. Update demon 160 includes HTTP, FTP and/or any other suitable client functionality for establishing connections with remote devices (e.g., update server 28 of bandwidth management device configuration server 60) connected to computer network 50.

Administrator interface 150 facilitates the configuration of bandwidth management device 30 and allows access to report data detailing the operation of bandwidth management device 30 and bandwidth utilization and other network statistics on a per-traffic-class basis. Administrator interface 150 allows administrators to select identified traffic classes and associate them with bandwidth utilization controls, as more fully described below. Administrator interface 150 can be a command line interface and/or a graphical user interface accessible, for example, through a conventional browser on client device 42.

A.1. Packet Processing

In one embodiment, when packet processor 131 encounters a new data flow it stores the source and destination IP addresses contained in the packet headers in host database 134. Packet processor 131 further constructs a control block object including attributes characterizing a specific flow between two end systems. In one embodiment, a control block object contains a flow specification object including such attributes as pointers to the "inside" and "outside" IP addresses in host database 134, as well as other flow specification parameters, such as inside and outside port numbers, service type, protocol type and other parameters characterizing the data flow. In one embodiment, such parameters can include information gleaned from examination of data within layers 2 through 7 of the OSI reference model. U.S. Pat. No. 6,046,980, incorporated by reference herein, discloses classification of data flows for use in a packet-based communications environment. FIG. 1 illustrates the concept associated with inside and outside addresses. As discussed above, in one embodiment, a flow specification object includes an "inside" and "outside" address relative to bandwidth management device 30. See FIG. 1. For a TCP packet, packet processor 131 can compute the inside and outside addresses based on the source and destination addresses of the packet and the direction of the packet flow. Other flow specification attributes can include inside and outside port number, service type, protocol, etc.

In one embodiment, packet processor 131 creates and stores control block objects corresponding to data flows in flow database 135. In one embodiment, control block object attributes include a pointer to a corresponding flow specification object, as well as other flow state parameters, such as TCP connection status, timing of last packets in the inbound and outbound directions, HTTP state, speed information, apparent round trip time, etc. In one embodiment, to facilitate association of an existing control block object to subsequent packets associated with a data flow or connection, flow database 135 further maintains a control block hash table including a key comprising hashed value computed from a string comprising the inside IP address, outside IP address, inside port number, outside port number, and protocol type (e.g., TCP, UDP, etc.) and a pointer to the corresponding control block object. According to this embodiment, to identify whether a control block object exists for a given data flow, packet processor 131 hashes the values identified above and scans the hash table for a matching entry. If one exists, packet processor 131 associates the pointer to the corresponding control block object with the data flow.

A.2. Traffic Classification

A traffic class comprises a set of matching rules allowing for logical grouping of data flows that share the same characteristic or set of characteristics—e.g., a specific application, protocol, IP address, MAC address, port, etc. In one embodiment, each traffic class has at least one matching rule defining the criteria used for identifying a specific traffic type. In one embodiment, bandwidth management device 30 includes functionality allowing for classification of network traffic based on information from layers 2 to 7 of the OSI reference model.

Traffic class database 137 stores traffic classes associated with data flows that traverse access link 21. Traffic class database 137 stores the traffic classes and corresponding data (e.g., matching rules, policies, and partition pointers, etc.) related to each traffic class in a hierarchical tree. This tree is organized to show parent-child relationships—that is, a particular traffic class may have one or more subordinate child traffic classes with more specific characteristics (matching rules) than the parent class. For example, at one level a traffic class may be configured to define a particular user group or subnet, while additional child traffic classes can be configured to identify specific application traffic associated with the user group or subnet. In one embodiment, the root traffic classifications are "/inbound/" and "/outbound/" data flows. Any data flow not explicitly classified is classified as "/inbound/default/" or "/outbound/default/". In one embodiment, administrator interface 150 displays the traffic class tree and allows for selection of a traffic class and the configuration of bandwidth utilization controls for that traffic class, such as a partition, a policy, or a combination thereof. Administrator interface 150 also allows for the arrangement of traffic classes into a hierarchical classification tree (see above). Bandwidth management device 30 further allows an administrator to manually create a traffic class by specifying a set of matching rules and, as discussed below, also automatically creates traffic classes by monitoring network traffic across access link 21 and classifying data flows according to a set of criteria to create matching rules for each traffic type.

A.3. Traffic Type Identification and Automatic Traffic Classification

Traffic discovery engine 130, in one embodiment, is operative to apply predefined sets of matching criteria to identify a traffic type associated with data flows traversing bandwidth management device. In one embodiment, traffic discovery engine 130 creates traffic classes automatically in response to data flows traversing bandwidth management device 30 and stores such traffic classes in traffic class database 137. Automatic traffic classification is disclosed in application Ser. No. 09/198,090, now U.S. Pat. No. 6,412,000, which is incorporated herein by reference. In one embodiment, traffic discovery engine 130 must detect a minimum number of data flows within a predefined period for a given traffic type before it creates a traffic class in traffic class database 137. In one embodiment, such discovered traffic classes are, by default, attached to or associated with either a "/inbound/autodiscovered/" or "/outbound/autodiscovered/" bandwidth control category, as appropriate. As discussed below, administrator interface 150 allows for configuration of bandwidth controls for auto-discovered traffic classes. In one embodiment, auto-discovered traffic classes are automatically assigned predefined or default bandwidth utilization controls. U.S. patent application Ser. No. 09/198,051, incorporated by reference herein, discloses automatic assignment of bandwidth utilization controls for discovered traffic classes.

Traffic discovery engine 130, in one embodiment, is supported by one to a plurality of traffic identification tables in a relational database that allow for identification of a traffic type (e.g., application, service, protocol, etc.) based on the attributes of a particular data flow. In one embodiment, traffic discovery engine 130 includes a services table including the following fields: 1) service ID, 2) service aggregate (if any), 3) name of service, 4) service attributes (e.g., port number, outside IP address, etc.), and 5) default bandwidth management policy. A service aggregate encompasses a combination of individual services (each including different matching criteria, such as different port numbers, etc.) corresponding to the service aggregate. When bandwidth management device 30 encounters a new flow, traffic discovery engine 130 analyzes the control block object associated with the data flow against the service attributes in the services table to identify a service ID corresponding to the flow. In one embodiment, traffic discovery engine 130 may identify more than one service ID associated with the flow. In this instance, traffic discovery engine 130 associates the more/most specific service ID to the flow. For example, network traffic associated with a peer-to-peer file sharing service may be identified as TCP or HTTP traffic, as well as higher level traffic types such as the actual file sharing application itself (e.g., Napster, Morpheus, etc.). In this instance, traffic discovery engine 130 associates the flow with the most specific service ID.

As discussed above, if traffic discovery engine 130 identifies a threshold number of flows for a given service for which no traffic class has been configured, it will create a traffic class corresponding to the service type in traffic class database 137. In one embodiment, traffic discovery engine 130 constructs a set of matching rules based on the corresponding service attributes in the services table (and/or other tables associated with the service ID) and stores them in association with a traffic class identification in traffic class database 137. In one embodiment, traffic discovery engine 130 further stores the default bandwidth management policy associated with the service ID in traffic class database 137.

Bandwidth management device 30, in one embodiment, features a plug-in architecture that facilitates, among other things, updates to the traffic identification tables and other functionality that support traffic discovery engine 130. In one embodiment, each plug-in corresponds to a single service or service aggregate. A plug-in can contain data that extends and/or modifies one or more traffic identification tables and/or code that, when executed, is operative to determine whether a flow is of the service or service aggregate corresponding to the plug-in. Traffic discovery engine 130, in one embodiment, uses a shared (dynamic link) library loader to add traffic identification plug-ins to an existing software release during a boot sequence. The shared library loader, in one embodiment, is operative to determine whether any plug-ins exist (e.g., by checking a directory or other reserved file space), and to extend/modify traffic identification tables and/or register traffic-type specific code as required.

A.4. Flow Control Module

As discussed above, flow control module 132 enforces bandwidth controls on data flows traversing access link 21. A bandwidth control for a particular data flow can comprise a partition, a policy, or a combination of the two. Flow control module 132 can use any suitable functionality to enforce bandwidth controls known in the art, including, but not limited to class-based weighted fair queuing, Committed Access Rate (CAR) and "leaky bucket" techniques. Flow control module 132 may incorporate any or a subset of the TCP rate control functionality described in the cross-reference U.S. patents set forth above for controlling the rate of data flows.

A.4.a Partitions

A partition operates to manage bandwidth for aggregate data flows associated with a traffic class. A partition protects a network traffic class by guaranteeing a defined amount of bandwidth and/or limits a network traffic class by placing a cap on the amount of bandwidth a traffic class can consume. Partitions can be fixed or "burstable." A fixed partition allows a traffic class to use in the aggregate a defined amount of bandwidth. A fixed partition not only ensures that a specific amount of bandwidth will be available, but it also limits data flows associated with that traffic class to that same level. A burstable partition allows an aggregate traffic class to use a defined amount of bandwidth, and also allows that traffic class to access additional unused bandwidth, if needed. A cap may be placed on a burstable partition, allowing the traffic class to access up to a maximum amount of bandwidth, or the burstable partition may be allowed to potentially consume all available bandwidth across the access link. Partitions are arranged in a hierarchy—that is, partitions can contain partitions. For example, the bandwidth, or a portion of the bandwidth, available under a parent partition can be allocated among multiple child partitions. In one embodiment, at the highest level, a partition exists for all available outbound bandwidth, while another partition exists for all available inbound bandwidth across the particular access link. These partitions are then sub-dividable to form a hierarchical tree. For example, an enterprise employing static partitions may define a static partition for a PeopleSoft software application traffic class, and sub-divide this parent partition into a large burstable child partition for its human resources department and a smaller burstable child partition for the accounting department.

In one embodiment, a partition is created by selecting a traffic class and configuring a partition for it. As discussed above, configurable partition parameters include 1) minimum partition size (in bits per second); 2) whether it is burstable (that is, when this option is selected, it allows the partition to use available excess bandwidth; when the option is not selected the partition has a fixed size); and 3) maximum bandwidth to be used when the partition bursts.

A.4.b. Policies

Flow control module 132 is also operative to enforce bandwidth management policies on traffic across access link 21. Whereas partitions allow for control of aggregate data flows associated with a traffic class, policies allow for control of individual data flows. In one embodiment, flow control module 132 supports different policy types, including, but not limited to, priority policies, rate policies, and discard policies. A priority policy determines how individual data flows associated with a traffic class are treated relative to data flows associated with other traffic classes. A rate policy controls the rate of data flows, for example, to smooth bursty traffic, such as HTTP traffic, in order to prevent a TCP end system from sending data packets at rates higher than access link 21 allows, thereby reducing queuing in router buffers and improving overall efficiency. A rate policy can be configured to establish a minimum rate for each flow, allow for prioritized access to excess available bandwidth, and/or set limits on total bandwidth that the flow can consume. A discard policy causes flow control module 132 to discard or drop data packets or flows associated with a particular traffic class.

B. Bandwidth Management Update Server

Bandwidth management update server 28 stores files embodying updated traffic identification functionality and is operative to interact with bandwidth management device 30 to allow access to such files, as discussed more fully below. Update server 28, in one embodiment, includes HTTP or FTP server functionality to establish connections with bandwidth management device(s) 30 and to transmit upgrade files. Of course, update server 28 may employ any suitable protocols.

In one embodiment, update server 28 provides a web-based file system including plug-in files corresponding to new traffic types or modifications to existing ones. In one embodiment, update server 28 stores plug-in files in a hierarchical directory file structure organized by bandwidth management application version and application build. In one embodiment, plug-in files are named according to a predetermined file naming convention to facilitate management of the plug-in files. In one embodiment, the file naming convention is <filename>.<version>.plg, where <filename> is the name of the plug-in, <version> represents the plug-in version, and *.plg is a filename extension indicating the file is a plug-in. Of course, any suitable file naming convention can be employed. In one embodiment, each plug-in file includes a date stamp to provide an additional or alternative mechanism for identifying the latest version of a given plug-in file. Accordingly, assuming for didactic purposes up to three different builds (e.g., for enterprise, ISP and ASP editions) for each software version, the directory file structure according to one embodiment becomes at the root level:

enterprise/<software version>/
    <filename>.<version>.plg isp/<software version>/<filename>.<version>.plg asp/<software version>/<filename>.<version>.plg According to the directory structure provided above, each software version includes one or more traffic identification plug-ins. In one embodiment, the plug-ins associated with a specific application version are incorporated into the subsequent version of the application obviating the need for the same plug-ins in the folder corresponding to the subsequent release. As discussed more fully below, update demon 160 is operative to access the file system implemented by update server 28 to receive plug-ins embodying updated traffic identification functionality. In another embodiment, the directory file structure may be configured to allow for enforcement of a licensing scheme including multiple levels of access to the update plug-ins. For example, a licensing scheme can be arranged such that a particular bandwidth management device may implement a subset of all available traffic identification tables. The directory file structure according to such an embodiment may be:

<build>/<license set>/<software version>/
<filename>.<version>.plg.

Alternatively, control over access to different plug-ins may be accomplished by a variety of other access control functionality, such as password- or key-based authentication schemes and the like.

C. Operation

C.1. Enforcement of Bandwidth Utilization Controls

Figure 3:
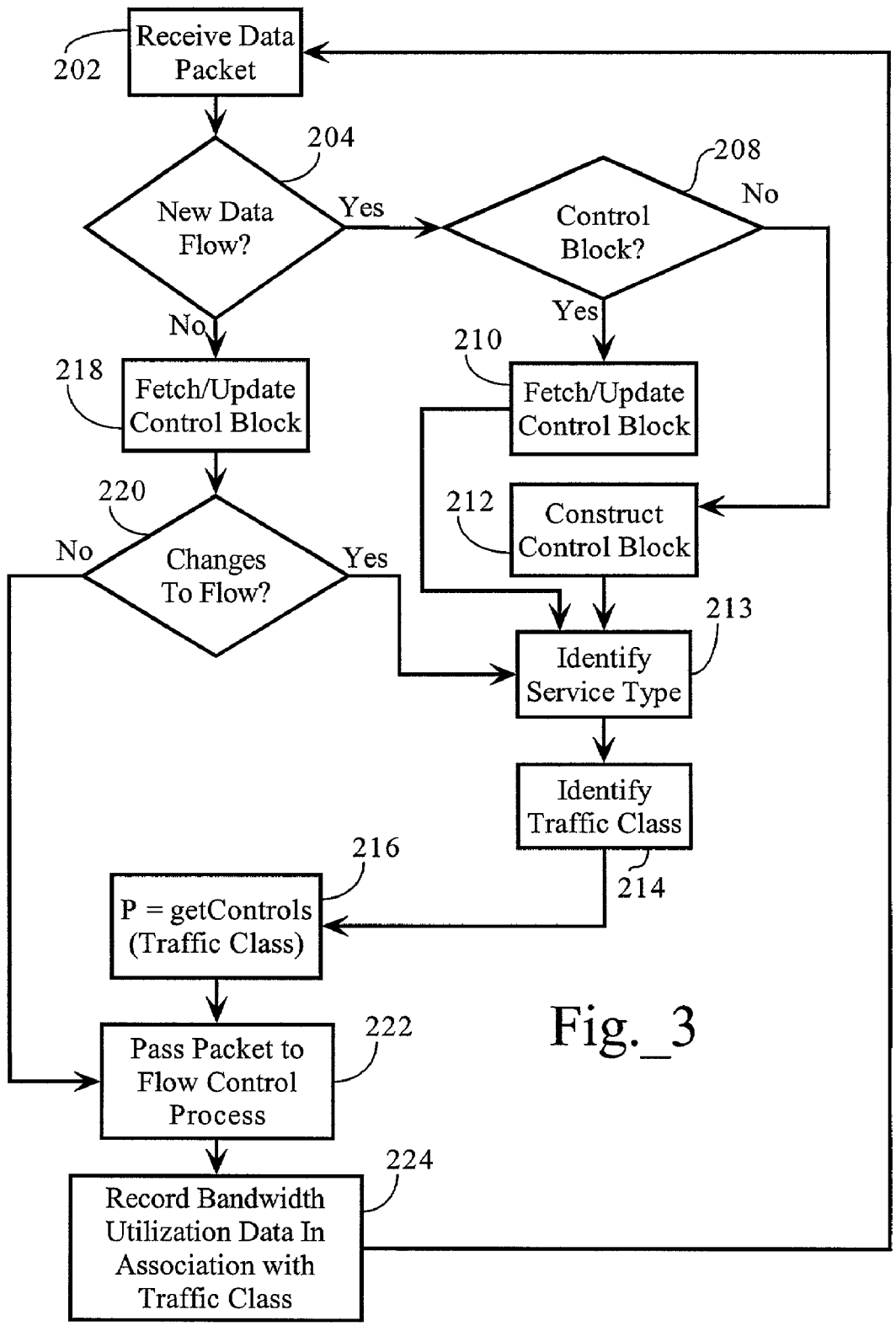
FIG. 3 is a flow chart providing a method allowing for enforcement of bandwidth utilization controls on network data flows.

FIG. 3 illustrates a method, according to one embodiment, facilitating the enforcement of bandwidth utilization controls on data flows transmitted across bandwidth management device 30. The method for enforcing bandwidth utilization controls, however, is not critical to the present invention; any suitable method can be employed. In one embodiment, packet processor 131 receives a data packet (FIG. 3, step 202) and determines whether the packet is part of a new data flow (step 204) or represents a change to an existing data flow (see steps 218 and 220). Methods for determining new data flows and assigning packets to existing data flows are well known in the art and also depend on the particular transport layer protocol employed. For a TCP packet, packet processor 131 can determine a new data flow by detecting SYN and/or SYN/ACK packets. However, a new data flow can simply be a data flow for which there is no corresponding control block object in flow database 135. In some embodiments, packet processor 131 may have to encounter multiple packets to identify and fully characterize a new data flow (e.g., identify a service type, traffic class, etc.). For example, U.S. Pat. No. 6,046,980 issued to Packer, identified above, discloses methods for classifying packet network flows.

If the packet is a new data flow, packet processor 131 determines whether flow database 135 contains an existing control block object corresponding to the flow (step 208) (see Section A.1., supra). If so, packet processor 131 retrieves the control block object, updates various attributes (e.g., last packet time, etc.), and associates the packet with the control block object (step 210). If flow database 135 does not contain a control block object associated with the new data flow, packet processor 131 constructs a control block object including attributes characterizing the data flow (step 212) (see above). In one embodiment, packet processor 131 analyzes the source and destination IP addresses in the packet header and scans host database 134 for matching entries. If no matching entries exist, packet processor 131 creates new entries for the source and destination IP addresses. As discussed above, in one embodiment, a control block object contains a flow specification object including such attributes as pointers to the "inside" and "outside" IP addresses in host database 134, as well as other flow specification parameters, such as inside and outside port numbers, service type, protocol type and other parameters characterizing the data flow.

If the packet corresponds to an existing data flow, packet processor 131 retrieves the control block object and updates attributes of the control block object and/or flow specification object as appropriate (step 218). If elements of the data packet represent a change to the traffic type associated with the flow (step 220), packet processor 131 passes the flow specification object to traffic discovery engine 130 to identify a service type corresponding to the flow (step 213). Methods for determining changes to data flows are also well known in the art. For example, an email may include an attached digital image file. Accordingly, while the initial packets in the data flow may include simple text data, subsequent packets may contain image data. Packet processor 131, in one embodiment, is operative to detect such changes in the characteristics of the data flow by examining data encapsulated in upper layers of each packet.

To identify a traffic class associated with the data flow, packet processor 131 passes the flow specification object to traffic discovery engine 130. In one embodiment, the flow specification object or a copy of it is stored in association with the packet and in the same buffer structure to facilitate access to the flow specification object by traffic discovery engine 130 and traffic class database 137. Traffic discovery engine 130 operates on attributes of the control block object and/or flow specification object to identify an existing service type (step 213). As discussed above, traffic discovery engine 130, in one embodiment, looks up various control block object attributes against its traffic identification tables to identify a service type corresponding to the flow. For example, traffic discovery engine 130 may match the port number associated with a flow to a particular service type. Traffic discovery engine may also look up information in other traffic identification tables or execute traffic discovery logic depending on the attribute values of the control block object. In addition, traffic discovery engine 130 may operate to create a traffic class in traffic class database 137 (see Section A.3., above). In one embodiment, such discovered traffic classes are attached to the "auto-discovered" bandwidth control category discussed above.

Traffic class database 137, in one embodiment, then applies matching rules based on the attribute values of the flow specification object and identifies a traffic class associated with the data flow (step 214). In one embodiment, the control block object in flow database 135 includes a pointer to the identified traffic class in traffic class database 137.

Rate control module 132 then accesses traffic class database 137 to retrieve the bandwidth utilization controls (e.g., partition and/or policy) associated with the traffic class (step 216) and enforces the bandwidth utilization controls on the data packet flow (step 222). As discussed above, the particular packet flow control mechanism employed is not critical to the present invention. A variety of flow control technologies can be used, such as the flow control technologies disclosed in co-pending and commonly owned application Ser. No. 10/108,085, incorporated herein by reference above, as well as other rate control technologies. In addition, measurement engine 140 records data associated with the packet (step 224) to allow for analysis of bandwidth utilization and other network statistics on a traffic class and/or partition level.

C.2. Updating Traffic Identification Functionality

FIGS. 4 and 5 illustrate process flows associated with updates to the traffic identification functionality implemented by bandwidth management device 30. As FIG. 4 illustrates, when invoked, update demon 160, in one embodiment, transmits a registration request to update server 28 (FIG. 4, step 302). Update server 28 receives the registration request (FIG. 5, step 402) and transmits an authentication challenge in response (step 404). Update demon 160, in one embodiment, responds to the authentication challenge by transmitting a bandwidth management device identification (e.g., a serial number) and a digital certificate (in one embodiment, encrypted using a private key of the entity associated with the update server 28) allowing for authentication of the bandwidth management device (step 304). Update server 28 authenticates the response by decrypting the digital certificate (in one embodiment, using a public key) and validating the response (step 406). If the digital certificate is valid, update server requests a configuration profile from bandwidth management device (step 408). Update server 28 may also perform other checks, such as determining whether the bandwidth management device identification is associated with a valid, unexpired license. Of course, the present invention can incorporate any suitable authentication protocols. For example, the authentication protocols may extend to authentication of the update server 28. For example, after authenticating bandwidth management device 30, update server 28 may generate and transmit a digital certificate to bandwidth management device 30. Using any suitable validation method, such as decrypting the digital certificate using a public key or a shared secret key (depending on the protocol), the update demon validates the digital certificate before the upgrade files are downloaded.

Update demon 160 transmits a bandwidth management device configuration profile to update server 28 (step 308). A bandwidth management device configuration profile, according to one embodiment, comprises: a build identification, a version identifier, and a license set identifier. In another embodiment, the device configuration profile may also include a list of plug-in file identifiers corresponding to the plug-ins already installed on bandwidth management device 30. Update server 28 receives the device configuration profile (step 410) and, using the build and version to locate the correct file directory, searches for the most recent plug-in files corresponding to the application build and version associated with bandwidth management device 30 (step 412). In one embodiment, update server 28 checks the identified plug-ins against the list of installed plug-ins transmitted with the device configuration profile to determine whether bandwidth management device 30 is already configured with the latest upgrades. If there are plug-ins available for download (step 414), update server 28 transmits them to bandwidth management device 30 (step 416). Otherwise, update server 28 transmits a response indicating that no plug-ins are available (step 418). Update demon 160 receives the plug-in files (308) and stores them in a reserved file space (step 310). In one embodiment, update demon 160 then causes bandwidth management device 30 to re-boot to allow for installation of the newly downloaded plug-ins.

As discussed above, the license associated with bandwidth management device 30 may also control what, it any, plug-ins are transmitted by update server 28. In one embodiment, a license set identifier is transmitted with the bandwidth management device configuration profile. In one embodiment, the device configuration profile includes a digital certificate comprising a one-way hashed device configuration profile to allow for detection of modifications to the license set identifier transmitted by bandwidth management device 30. That is, update server 28 can detect unauthorized modifications to the device configuration profile (such as changes to the license set identifier) by hashing the device configuration profile using the same encryption key and comparing it to the digital certificate transmitted by bandwidth management device 30. After authentication of the device configuration profile, update server 30, as discussed above, located the appropriate file directory using the build, version and license set identifications, to search for available plug-ins.

A variety of other implementations are possible. For example, update demon 160 and update server 28 can be configured such that update demon 160 searches of available plug-in files on update server 28. According to one embodiment, each plug-in file is tagged with meta data such as time stamps, plug-in identifiers, and required license set identifiers. Update server 28, according to such an embodiment, is operative to check such meta data against the device configuration profile before transmitting a plug-in file or set of plug-in files.

D. Exemplary Embodiments

FIG. 1 illustrates a system according to one embodiment where at least one bandwidth management device 30 interacts with update server 28 to receive files embodying upgraded traffic identification functionality. A variety of other configurations, however, are possible. FIG. 6, for example, illustrates an alternative configuration including a centralized bandwidth management device configuration server 60 operative to provide centralized management of multiple bandwidth management devices 30a, 30b, 30c. In one embodiment, bandwidth management device configuration server 60 facilitates the repetitious task of propagating configuration changes to multiple bandwidth management devices 30a, 30b, 30c. Bandwidth management device configuration server 60 may be administered by the same administrative entity as bandwidth management devices 30a, 30b, and 30c. Alternatively, the functionality of bandwidth management device configuration server 60 may be outsourced to a separate administrative entity, such as an ISP or ASP.

As FIG. 6 shows, bandwidth management device configuration server 60 comprises device configuration database 62, local update database 64, and update demon 260. Device configuration database 62 stores the bandwidth management device configuration profiles (see above) for centrally-managed bandwidth management devices 30a, 30b, 30c. Local update database 64 stores files embodying the upgraded traffic identification functionality as required for the different device configuration profiles of the centrally-managed bandwidth management devices 30a, 30b, 30c. Update demon 260 operates similarly to update demon 160; however, when invoked, update demon 260 is operative to retrieve updated traffic identification files for multiple bandwidth management devices. Specifically, update demon 260 registers with update server 28 and transmits the device configuration profiles associated bandwidth management devices 30a, 30b, 30c. Update demon 260 then stores the upgraded traffic identification files in local update database 64. These upgraded traffic identification files ultimately propagate to bandwidth management devices 30a, 30b, 30c, as discussed below.

Bandwidth management devices 30a, 30b, 30c each include update demon 160; however, rather than registering with update server 28, update demon 160 is configured to register with bandwidth management device configuration server 60 to retrieve the files embodying updated traffic identification functionality. In one embodiment, device configuration server 60 transmits a message to bandwidth management devices 30a, 30b, 30c to indicate the availability of upgraded traffic identification functionality. The receipt of such a message invokes update demon 160 to register and retrieve the files. In another embodiment, bandwidth management devices 30a, 30b, 30c initiate connections to bandwidth management device configuration server 60 to overcome certain access issues presented by firewalls controlling access to networks 40a, 40b, 40c. In one embodiment, bandwidth management devices 30a, 30b, 30c are configured to maintain persistent queries with bandwidth management device configuration server 60, using the Lightweight Directory Access Protocol (LDAP) or any other suitable protocol. When signaled by a change in the settings associated with bandwidth management device configuration server 60, update demon 160 is invoked and initiates a HTTP connection with bandwidth management device configuration server 60 and retrieves the updated traffic identification functionality as discussed above.

Lastly, although the present invention has been described as operating in connection with end systems employing the TCP and IP protocols, the present invention has application in computer network environments employing any suitable transport layer and network layer protocols. In addition, although embodiments of the present invention have been described as operating in connection with bandwidth management devices, the present invention can be applied to a variety of network devices, such as routers or other network devices implementing traffic identification functionality. Moreover, the present invention can be applied to wireline computer networks, wireless computer networks, or a combination of both. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. A system facilitating the distribution of updated traffic identification functionality to at least one network device over a computer network, comprising
    an update server,
        comprising a traffic identification update database storing update files embodying upgraded traffic identification functionality,
        wherein the update server is operative to:
            transmit at least one update file to at least one network device over a computer network;
    at least one network device operative to:
        identify traffic types corresponding to data flows traversing an access link; wherein the at least one network device comprises an update demon operative to
        transmit a network device configuration profile to the update server, wherein the network device configuration profile comprises a license set identifier and a cryptographic hash of the network device configuration profile;
        interact with the update server to receive at least one update file embodying upgraded traffic identification functionality; and
        install the at least one update file received from the update server to thereby allow for execution of upgraded traffic identification functionality; wherein the update server is further operative to
        detect changes to the license set identifier by validating the cryptographic hash of the network device configuration profile; and
        use the network device configuration profile to locate the at least one update file.

2. The system of claim 1 wherein the at least one network device is further operative to enforce bandwidth utilization controls across the access link on data flows associated with corresponding traffic types.

3. The system of claim 1 wherein the at least one network device is a bandwidth management device.

4. The system of claim 1 wherein the at least one update file comprises at least one plug-in, and wherein the at least one network device further comprises a shared library loader operative to incorporate the at least one plug-in into the traffic identification functionality implemented by the at least one network device.

5. The system of claim 1 wherein the device configuration profile comprises a build identifier and a version identifier.

6. The system of claim 5 wherein the device configuration profile further comprises a list of at least one update file installed on the at least one network device.

7. The system of claim 1 wherein the update server is operative to control access to the at least one update file based on the validated license set identifier associated with the network device.

8. The system of claim 1 wherein the update server is operative to transmit an authentication document to the at least one network device; and wherein the at least one network device is operative to validate the authentication document.

9. The system of claim 8 wherein the authentication document is a digital certificate.

10. A system facilitating the distribution of updated traffic identification functionality to at least one network device over a computer network, comprising
    an update server,
        comprising a traffic identification update database storing at least one update file embodying upgraded traffic identification functionality,
        the update server is operative to:
            transmit at least one update file to at least one network device operably connected to a computer network;
    a network device management server operative to:
        store at least one network device configuration profile corresponding to at least one managed network device, wherein the network device configuration profile comprises a license set identifier and a cryptographic hash of the network device configuration profile;
        transmit a network device configuration profile corresponding to a managed network device to the update server,
        receive and store at least one update file embodying upgraded traffic identification functionality corresponding to at least one network device; and
    at least one network device operative to:
    identify traffic types corresponding to data flows traversing an access link;
        interact with the network device management server to receive the at least one update file embodying upgraded traffic identification functionality; and
        install the at least one update file received from the network device management server to thereby allow for execution of upgraded traffic identification functionality;
    wherein the update server is further operative to
        detect changes to the license set identifier transmitted by the network device management server by validating the cryptographic hash of the network device configuration profile; and
        use the network device configuration profile to locate the at least one update file in the traffic identification update database.

11. The system of claim 10 wherein the at least one network device is further operative to enforce bandwidth utilization controls across the access link on data flows associated with corresponding traffic types.

12. The system of claim 10 wherein the at least one network device is a bandwidth management device.

13. The system of claim 10 wherein the at least one network device comprises an update demon operative to interact with the network device management server to receive at least one update file embodying upgraded traffic identification functionality.

14. The system of claim 10 wherein the network device management server comprises an update demon operative to interact with the update server to receive and store at least one update file embodying upgraded traffic identification functionality corresponding to the at least one network device.

15. The system of claim 10 wherein the at least one update file comprises at least one plug-in, and wherein the at least one network device further comprises a shared library loader operative to incorporate the at least one plug-in into the traffic identification functionality implemented by the at least one network device.

16. The system of claim 10 wherein the device configuration profile comprises a build identifier and a version identifier.

17. The system of claim 16 wherein the device configuration profile further comprises a list of at least one update file installed on the at least one network device.

18. The system of claim 10 wherein the update server is operative to control access to the at least one update file based on the validated license set identifier associated with the at least one network device.

19. An apparatus operating in connection with an update server operably coupled to a computer network, the update server storing at least one update file embodying upgraded traffic identification functionality, comprising a network device comprising:
   a traffic discovery engine operative to identify traffic types corresponding to data flows traversing an access link;
   a traffic class database storing traffic classes in association with matching rules and bandwidth utilization controls;
     wherein the traffic discovery engine is operative to create traffic classes in the traffic class database in response to data flows traversing the access link;
   a bandwidth control mechanism operative to enforce bandwidth utilization controls on data flows associated with corresponding traffic classes across the access link; and
an update demon operative to:
   transmit a network device configuration profile to the update server, wherein the network device configuration profile comprises a license set identifier and a cryptographic hash of the network device configuration profile
   interact with the update server to receive at least one update file embodying upgraded traffic identification functionality; and
   install the at least one update file for execution by the traffic discovery engine.

20. The apparatus of claim 19 wherein the at least one update file comprises at least one plug-in, and wherein the apparatus further comprises a shared library loader operative to incorporate the at least one plug-in into the traffic identification functionality implemented by the traffic discovery engine.

* * * * *